(12) United States Patent
Mori (10) Patent No.: US 9,045,175 B2
(45) Date of Patent: Jun. 2, 2015

(54) VEHICLE BODY ROCKER STRUCTURE

(75) Inventor: Takeo Mori, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 13/516,935

(22) PCT Filed: Aug. 26, 2010

(86) PCT No.: PCT/JP2010/064514
§ 371 (c)(1),
(2), (4) Date: Jun. 18, 2012

(87) PCT Pub. No.: WO2012/026028
PCT Pub. Date: Mar. 1, 2012

(65) Prior Publication Data
US 2013/0140854 A1    Jun. 6, 2013

(51) Int. Cl.
*B60J 7/00* (2006.01)
*B62D 25/20* (2006.01)
*B62D 25/02* (2006.01)

(52) U.S. Cl.
CPC .......... *B62D 25/2036* (2013.01); *B62D 25/025* (2013.01)

(58) Field of Classification Search
CPC .. B62D 25/025; B62D 25/2036; B62D 25/04; B62D 21/157; C08L 23/10; H01L 2924/00; H01L 2224/482227; H01L 2224/32225; H01L 2224/73265; H01L 2924/00014
USPC .......... 296/209, 187.12, 193.06, 202, 203.01, 296/203.02, 203.03, 204; 29/401.1, 897.2
See application file for complete search history.

(56) References Cited

U.S. PATENT DOCUMENTS

| | | | |
|---|---|---|---|
| 5,782,525 A * | 7/1998 | Honma et al. ........... 296/187.12 |
| 6,409,257 B1 * | 6/2002 | Takashina et al. ............ 296/209 |
| 6,428,085 B1 | 8/2002 | Miyasaka et al. | |
| 6,474,726 B1 * | 11/2002 | Hanakawa et al. ........... 296/191 |
| 7,380,830 B2 | 6/2008 | Mitsui et al. | |

(Continued)

FOREIGN PATENT DOCUMENTS

| | | |
|---|---|---|
| DE | 10 2007 017 165 A1 | 10/2008 |
| JP | U-63-119150 | 8/1988 |

(Continued)

OTHER PUBLICATIONS

Nov. 9, 2010 International Search Report issued in International Patent Application No. PCT/JP2010/064514 (with translation).

*Primary Examiner* — Kiran B Patel
(74) *Attorney, Agent, or Firm* — Oliff PLC (57) ABSTRACT

A vehicle body rocker structure includes a plate-like inner member and a plate-like outer member that extend in a vehicle backward-forward direction and join with each other in a vehicle width direction as a structure member for constituting a rocker, wherein respective cross-sections of the inner member and the outer member include upper joint portions, lower joint portions, at least one convex portion caused to project to opposite sides joining therebetween, and concave portions disposed between the upper and lower joint portions as well as on a vehicle body upper and lower side of the convex portions, respectively, and the upper joint portions, the lower joint portions, and the convex portions of the inner member and the outer member are joined with each other, respectively and plural closed cross-sections are formed in the vehicle body up-down direction.

14 Claims, 11 Drawing Sheets

(56) References Cited

U.S. PATENT DOCUMENTS

| | | | |
|---|---|---|---|
| 7,481,485 B2* | 1/2009 | Ma et al. | 296/187.12 |
| 7,731,274 B2* | 6/2010 | Kishima et al. | 296/203.03 |
| 7,976,098 B2* | 7/2011 | Nishimura et al. | 296/193.06 |
| 8,118,355 B2* | 2/2012 | Tamura et al. | 296/209 |
| 8,128,157 B2* | 3/2012 | Heo et al. | 296/193.06 |
| 8,220,867 B2* | 7/2012 | Mori | 296/209 |
| 8,235,568 B2* | 8/2012 | Heiden et al. | 362/495 |
| 8,282,154 B2* | 10/2012 | Maruyama | 296/193.05 |
| 8,308,227 B2* | 11/2012 | Tsuruta et al. | 296/209 |
| 8,480,163 B2* | 7/2013 | Mori | 296/193.06 |
| 2003/0184126 A1* | 10/2003 | Yamazaki et al. | 296/209 |
| 2004/0113461 A1* | 6/2004 | Shimizu et al. | 296/193.06 |
| 2006/0001294 A1* | 1/2006 | Balgaard et al. | 296/209 |
| 2007/0187995 A1* | 8/2007 | Mouch et al. | 296/209 |
| 2009/0146457 A1* | 6/2009 | Kanagai et al. | 296/187.12 |
| 2009/0236166 A1* | 9/2009 | Kowaki et al. | 180/232 |
| 2010/0264637 A1* | 10/2010 | Kosaka et al. | 280/784 |
| 2010/0270830 A1 | 10/2010 | Maruyama | |
| 2011/0061237 A1* | 3/2011 | Chen et al. | 29/897.2 |
| 2011/0210582 A1* | 9/2011 | Mori | 296/193.07 |
| 2011/0241384 A1* | 10/2011 | Mori | 296/193.06 |
| 2011/0272969 A1* | 11/2011 | Mori | 296/193.07 |
| 2011/0285175 A1* | 11/2011 | Imamura | 296/193.05 |
| 2011/0304175 A1* | 12/2011 | Mori | 296/193.06 |
| 2012/0038187 A1* | 2/2012 | Mori | 296/193.07 |
| 2012/0086238 A1* | 4/2012 | Tan | 296/209 |
| 2012/0098297 A1* | 4/2012 | Kurokawa | 296/193.06 |
| 2012/0104793 A1* | 5/2012 | Danielson et al. | 296/181.1 |
| 2012/0153675 A1* | 6/2012 | Rawlinson et al. | 296/193.06 |
| 2012/0313400 A1* | 12/2012 | Balzer et al. | 296/193.06 |
| 2013/0140854 A1* | 6/2013 | Mori | 296/209 |

FOREIGN PATENT DOCUMENTS

| | | |
|---|---|---|
| JP | A-02-063978 | 3/1990 |
| JP | A-09-183388 | 7/1997 |
| JP | A-09-202268 | 8/1997 |
| JP | A-10-316046 | 12/1998 |
| JP | A-11-245741 | 9/1999 |
| JP | A-2001-071949 | 3/2001 |
| JP | A-2002-029455 | 1/2002 |
| JP | A-2004-314845 | 11/2004 |
| JP | A-2009-227104 | 10/2009 |
| WO | WO 2009/078288 A1 | 6/2009 |

* cited by examiner

VEHICLE BODY ROCKER STRUCTURE

FIELD

The present invention relates to a vehicle body rocker structure extending in a vehicle body backward-forward direction on both side portions of a floor panel of a vehicle.

BACKGROUND

Conventionally, various modes of rocker structures are known as a rocker structure of a vehicle body. For example, Patent Literature 1 described below discloses a side sill (rocker structure) configured by joining a sill inner composed of an extruded member and formed to have a rectangular cross-section (so-called an 8-shape cross section) so that a cross-sectional shape has an intermediate rib inside thereof with a sill outer composed of a press-molded member and formed in a C-cross-sectional shape.

Note that Patent Literature 2 described below discloses a front member of a front side frame that is integrally extrusion molded of a frame member composed of a pair of upper and lower square pipe members and having a closed cross-section shape and a flat plate portion for coupling the frame members. Further, Patent Literature 3 described below discloses a front side frame configured by joining two members disposed in a vehicle width direction in confrontation. The members have a convex portion in a central portion caused to project to the other member, an upper end flange portions, and a lower end flange portion, and the front side frame is configured by joining the upper end flange portions with each other and the lower end flange portions with each other, respectively. The front side frame has portions in which closed cross-sections are formed in an up-down direction by joining also the convex portions with each other, and the portions are used as buckling portions in a vehicle width direction with respect to a load in a vehicle body backward-forward direction. Further, Patent Literature 4 described below discloses a front side member that has a front end portion composed of two upper and lower closed cross-sectional structures having a cross-section formed in an 8-shape and has a portion succeeding the front end portion composed of a single closed cross-sectional structure having a rectangular cross-section so that rigidity is gradually increased from forward to backward. Further, Patent Literature 5 described below discloses a side sill front end portion coupling structure for coupling a side sill front end portion with a lower portion of a front pillar, wherein a load input in a vehicle body backward-forward direction is absorbed by deforming a lower portion of the front pillar.

CITATION LIST

Patent Literature

Patent Literature 1: Japanese Patent Application Laid-open No. H10-316046
Patent Literature 2: Japanese Patent Application Laid-open No. H02-063978
Patent Literature 3: Japanese Patent Application Laid-open No. 2009-227104
Patent Literature 4: Japanese Patent Application Laid-open No. H09-183388
Patent Literature 5: Japanese Patent Application Laid-open No. 2002-029455

SUMMARY

Technical Problem

Incidentally, to secure a desired strength, conventional rocker structures make a structure complicated and increases a weight. Further, in rocker structures, it is required to improve the strength to an input of a load in a vehicle body backward-forward direction and to improve the rigidity to an input of a load in a vehicle width direction.

Thus, an object of the present invention is to improve inconveniences of the conventional examples and to provide a vehicle body rocker structure capable of improving strength and rigidity while executing simplification and reducing a weight.

Solution to Problem

In order to achieve the above mentioned object, a vehicle body rocker structure according to the present invention includes a plate-like inner member and a plate-like outer member that extend in a vehicle backward-forward direction and confront with each other in a vehicle width direction as a structure member constituting a rocker, wherein respective cross-sections of the inner member and the outer member cut in a vehicle width direction as well as in a vehicle body up-down direction comprise an upper joint portion on a vehicle body upper side, a lower joint portion on a vehicle body lower side, at least one convex portions caused to project to opposite sides confronting between the upper joint portion and the lower joint portion, and concave portions disposed between the upper joint portion and the lower joint portion as well as on a vehicle body upper side and a vehicle body lower side of the convex portions, respectively, and the upper joint portions, the lower joint portions, and the convex portions of the inner member and the outer member are joined with each other, respectively and a plurality of closed cross-sections are formed in the vehicle body up-down direction.

Here, it is desirable that the projecting amount of the convex portions of the inner member or/and the outer member is gradually reduced toward backward of a vehicle, and the joint portions of the convex portions are desirably disposed only to a vehicle body front side.

Further, it is desirable that a hardness enhancement process is applied to the vehicle body front sides of the inner member and the outer member.

Further, it is desirable that reinforcing plates are disposed to the vehicle body rear sides of the inner member or/and the outer member.

Further, it is desirable that the rigidity of the rocker to a load in a joint portion with a center pillar in a vehicle width direction is more reduced than a periphery.

Further, it is desirable that the rocker joins the convex portions of the inner member and the outer member other than a joint portion with a center pillar.

Further, it is desirable that an apical end of the rocker is inserted into and joined with a front pillar as well as the strength to a load in a vehicle body backward-forward direction is made higher in the apical end than a not inserted portion of the apical end in the front pillar.

Advantageous Effects of Invention

The vehicle body rocker structure according to the present invention is configured by, for example, press molding a plate-like inner member and a plate-like outer member and has a simple configuration and a reduced weight. Then, in the rocker structure, the inner member and the outer member have concave-convex portions, respectively, and when they are joined, plural small closed cross-sections are formed by the concave-convex portions. Accordingly, the rocker structure can increase the strength to a load in a vehicle body backward-forward direction and the rigidity to a load in a vehicle width direction while executing simplification and reducing a weight.

DESCRIPTION OF EMBODIMENTS

Embodiments of a vehicle body rocker structure according to the present invention will be explained below in detail based on the drawings. Note that the present invention is not limited by the embodiments.

The vehicle body rocker structure according to the present invention has a plate-like inner member and a plate-like outer member that extend in a vehicle body backward-forward direction and confront in a vehicle width direction as a structure member that constitutes a rocker extending in the vehicle body backward-forward direction. In the rocker structure, the respective cross-sections of the inner member and the outer member cut in a vehicle width direction as well as in a vehicle body up-down direction have an upper joint portion on a vehicle body upper side, a lower joint portion on a vehicle body lower side, at least one convex portions that are caused to project toward opposite sides confronting between the upper joint and the lower joint, and concave portions disposed between the upper joint portion and the lower joint portion as well as on the vehicle body upper side and the vehicle body lower side of the convex portions, respectively. Then, in the rocker structure, a rocker is configured such that the upper joint portions, the lower joint portions, and the convex portions of the inner member and the outer member are joined with each other, respectively and thereby plural closed cross-sections are formed in a vehicle body up-down direction. The rocker is disposed to both the sides of a floor panel of a vehicle by extending in a vehicle body backward-forward direction. It is preferable to project the same number of convex portions toward the confronting opposite sides, respectively. In contrast, it is preferable to configure the concave portions so as to be continuous from the respective side surfaces of the convex portions and to share one side surfaces of the convex portions. When the inner member and the outer member have the same number of convex portions, the concave portions are formed in the number larger than the number of convex portions by one.

First Embodiment

A first embodiment of a vehicle body rocker structure according to the present invention will be explained based on FIG. 1 to FIG. 3.

Figure 1:
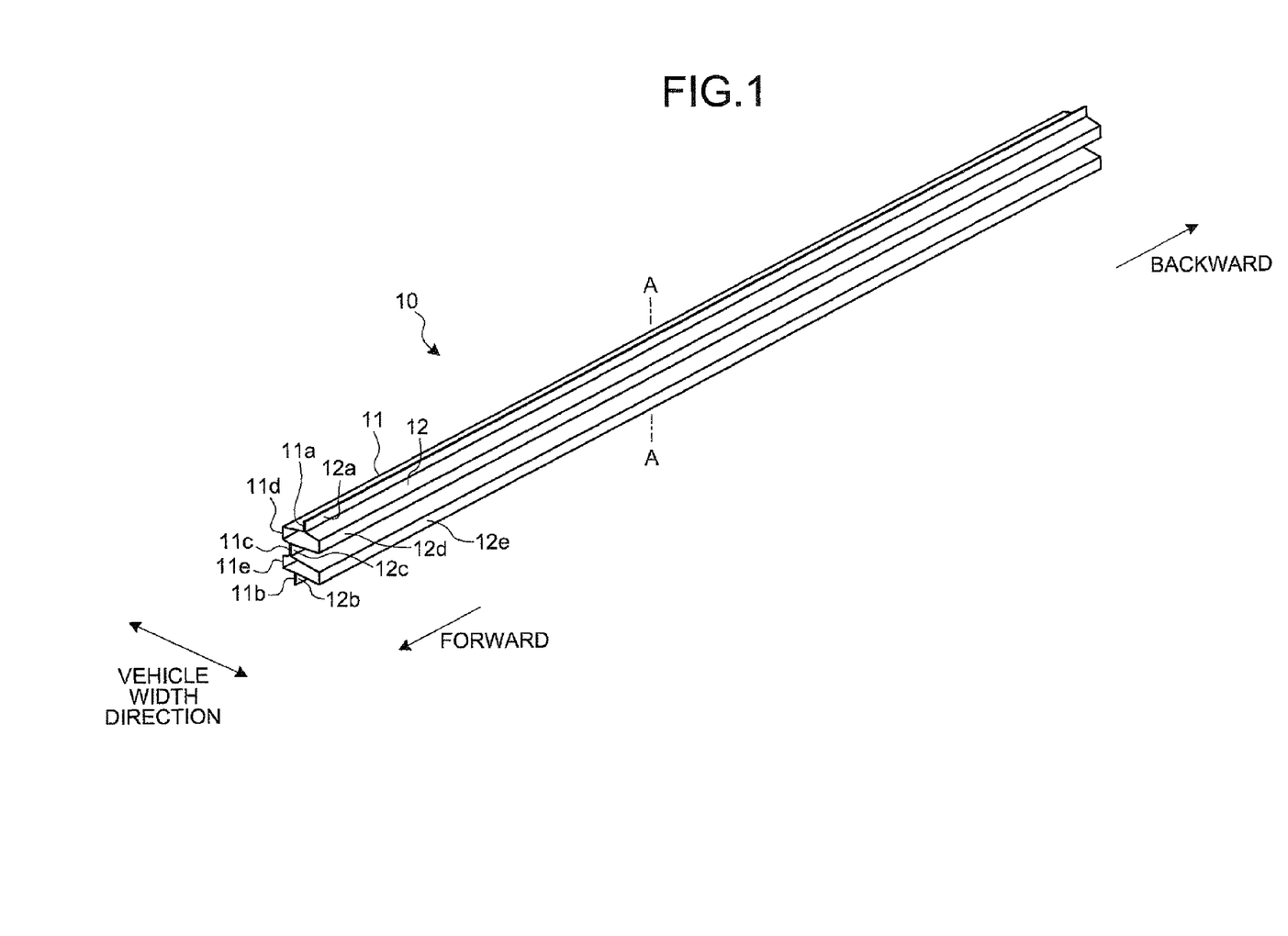
FIG. 1 is a perspective view showing a rocker structure of a vehicle body of a first embodiment.

A reference numeral 10 of FIG. 1 shows a rocker of the embodiment. The rocker 10 of the embodiment is configured such that a rocker inner 11 as an inner member that is caused to extend in a vehicle body backward-forward direction and a rocker outer 12 as an outer member that is caused to extend in the vehicle body backward-forward direction are joined in confrontation in a vehicle width direction. The rocker inner 11 is disposed nearer to the inside of a vehicle body than the rocker outer 12 in the vehicle width direction. That is, the rocker 10 of FIG. 1 is disposed on a floor panel (illustration omitted) on a left side of the vehicle body.

Figure 2:
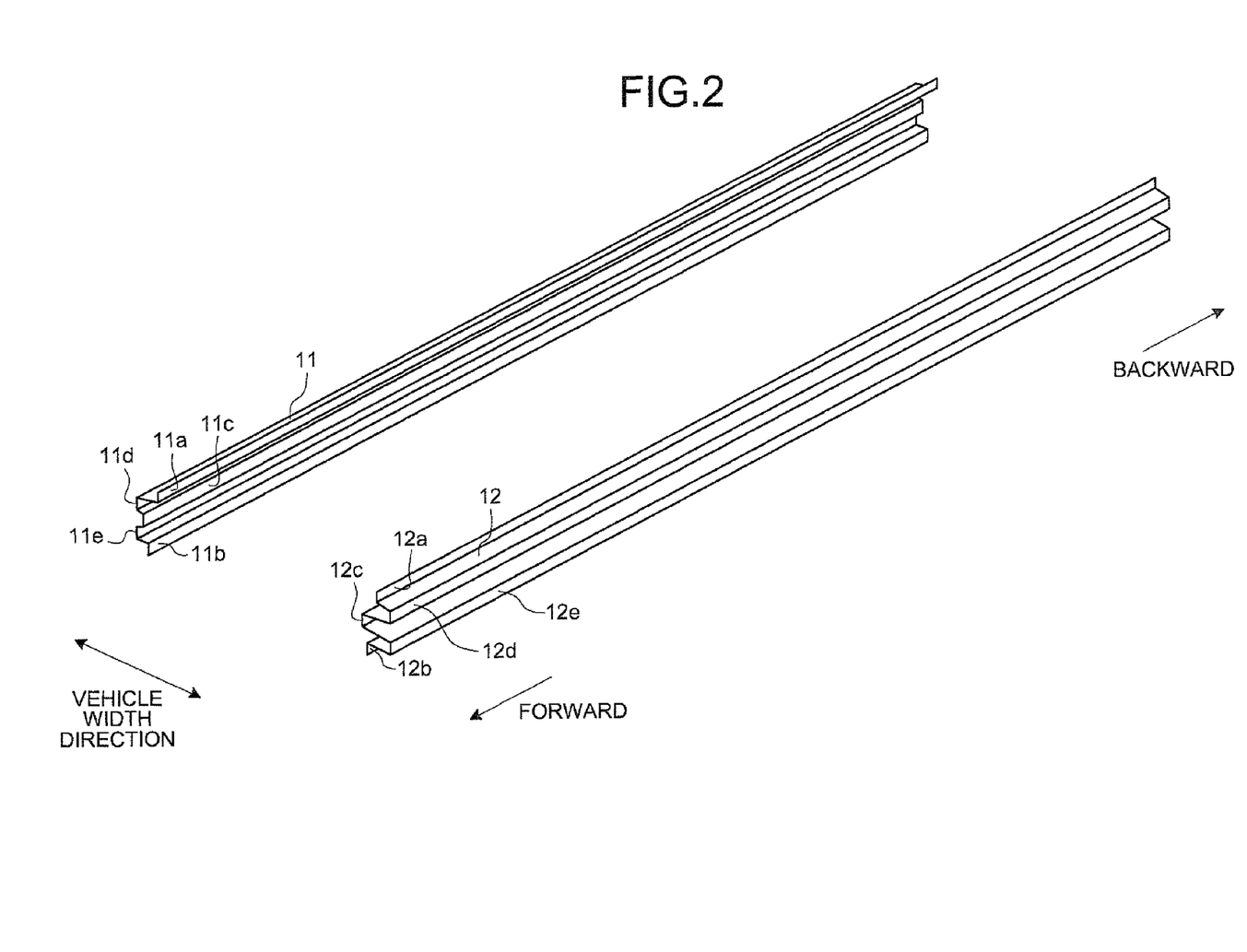
FIG. 2 is a perspective view showing an inner member and an outer member that configure a vehicle body rocker structure of the first embodiment.

The rocker inner 11 and the rocker outer 12 are, for example, press-molded in a plate shape and formed by alternately repeating concave-convex portions in a vehicle body up-down direction as shown in FIG. 2. Here, the rocker inner 11 and the rocker outer 12 are exemplified wherein the cross section of each of which is cut in the vehicle width direction as well as in the vehicle body up-down direction has a uniform shape from a front side to a back side of the vehicle body.

Figure 3:
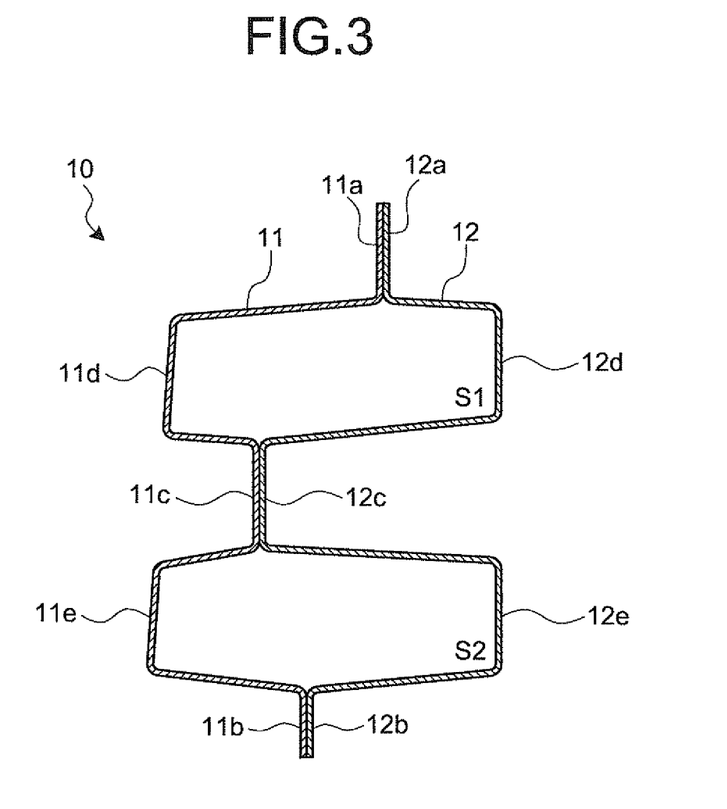
FIG. 3 is a sectional view of FIG. 1 observed from a vehicle body front side by cutting FIG. 1 in a vehicle width direction along an A-A line as well as in a vehicle body up-down direction.

As shown in FIG. 3, the cross section of the exemplified rocker inner 11 cut in the vehicle width direction as well as in the vehicle body up-down direction has an upper joint portion 11a on a vehicle body upper side and a lower joint portion 11b on the vehicle body lower side. Further, the cross-section has concave-convex portions alternately repeated between the upper joint portion 11a and the lower joint portion 11b. As the concave-convex portions, the rocker inner 11 has a convex portion 11c caused to project to the rocker outer 12 and concave portions 11d, 11e using a side surface of the convex portion 11c as one side surface thereof. The concave portions 11d, 11e are formed to the respective side surfaces of the convex portion 11c. Here, the upper joint portion 11a extends to upward of the vehicle body from a free end side of the concave portion 11d on the vehicle body upper side. Further, the lower joint portion 11b extends downward of the vehicle body from a free end side of the concave portion lie on a vehicle body lower side.

In contrast, a cross section of the rocker outer 12 cut in the vehicle width direction as well as in the vehicle body up-down direction has an upper joint portion 12a on the vehicle body upper side, a lower joint portion 12b on the vehicle body lower side, and concave-convex portions alternately repeated between the upper joint portion 12a and the lower joint portion 12b likewise the rocker inner 11. As the concave-convex portions, the rocker outer 12 has a convex portion 12c caused to project to the rocker inner 11 (strictly, the convex portion 11c), and concave portions 12d, 12e using a side surface of the convex portion 12c as one side surface thereof. The concave portions 12d, 12e are formed to the respective side surfaces of the convex portion 12c. Here, the upper joint portion 12a extends to upward of the vehicle body from a free end side of the concave portion 12d on the vehicle body upper side. Further, the lower joint portion 12b extends downward of the vehicle body from a free end side of the concave portion 12e on a vehicle body lower side.

That is, in the rocker inner 11 and the rocker outer 12, a central portion in the vehicle body up-down direction is disposed with the same number of convex portions 11c, 12c that are caused to project to the confronting opposite sides.

The upper joint portions 11a, 12a and the lower joint portions 11b, 12b are formed in flat plate shapes confronting with each other and cause respective flat portions to be abutted with each other when they are joined. That is, the rocker inner 11 and the rocker outer 12 join the upper joint portions 11a, 12a thereof with each other and the lower joint portions 11b, 12b thereof with each other, respectively. Welding such as spot welding and the like, for example, is used for the joint.

The respective convex portions 11c, 12c are formed in flat surfaces with projecting surfaces confronting with each other, and the projecting amount of the projecting surfaces is set so that when the upper joint portions 11a, 12a are joined with each other and the lower joint portions 11b, 12b are joined with each other, the projecting surfaces are also abutted with each other. In the rocker inner 11 and the rocker outer 12, the projecting surfaces of the convex portions 11c, 12c are also joined with each other by spot welding and the like.

As described above, in the rocker 10, the upper joint portions 11a, 12a, the lower joint portions 11b, 12b, and the convex portions 11c, 12c of the rocker inner 11 and the rocker outer 12 are joined with each other, respectively. Here, in the joined portions, welding points of a spot welding are set from the front side to the back side of the vehicle body at approximately equal intervals. Accordingly, in the rocker 10, as shown in FIG. 3, closed cross-sections S1, S2 of plural rectangles (to say strictly, polygons) disposed in the vehicle body up-down direction are formed between from the front side to the back side of the vehicle body.

The cross-sectional areas of the respective closed cross-sections S1, S2 become small in comparison with, for example, a single rectangular closed cross-section of a conventional rocker having an outside shape similar to that of the rocker 10. Accordingly, the rocker 10 can more suppress deformation of cross-sectional shape of the closed cross-sections S1, S2 with respect to a load in a direction other than the vehicle body backward-forward direction such as the vehicle width direction and the vehicle body up-down direction and the like than a conventional single rectangular closed cross-section by forming the plural closed cross-sections S1, S2 that are reduced in size within a range as large as a conventional range. Accordingly, even if the rocker inner 11 and the rocker outer 12 have a thin wall thickness, the rocker 10 can achieve the high rigidity to a load in the vehicle width direction without a reinforce member such as a reinforce member, a bulkhead, and the like.

Further, as shown in FIG. 3, in the rocker 10, the number of ridge lines formed by the respective concave-convex portions of the rocker inner 11 and the rocker outer 12 observed on a cross section cut in the vehicle width direction as well as in the vehicle body up-down direction increases with respect to, for example, the conventional rocker having the single rectangular closed cross-section. Accordingly, since the rocker 10 has the increased buckling strength to a load in the vehicle backward-forward direction, the rocker 10 can increase the strength to the load in the vehicle body backward-forward direction.

As shown above, in the embodiment, the rocker 10 that increases the strength to the load in the vehicle backward-forward direction and the bending rigidity to the load in the vehicle width direction and is light in weight can be obtained by a simple configuration.

Second Embodiment

A second embodiment of the vehicle body rocker structure according to the present invention will be explained based on FIG. 4 to FIG. 9.

Figure 4:
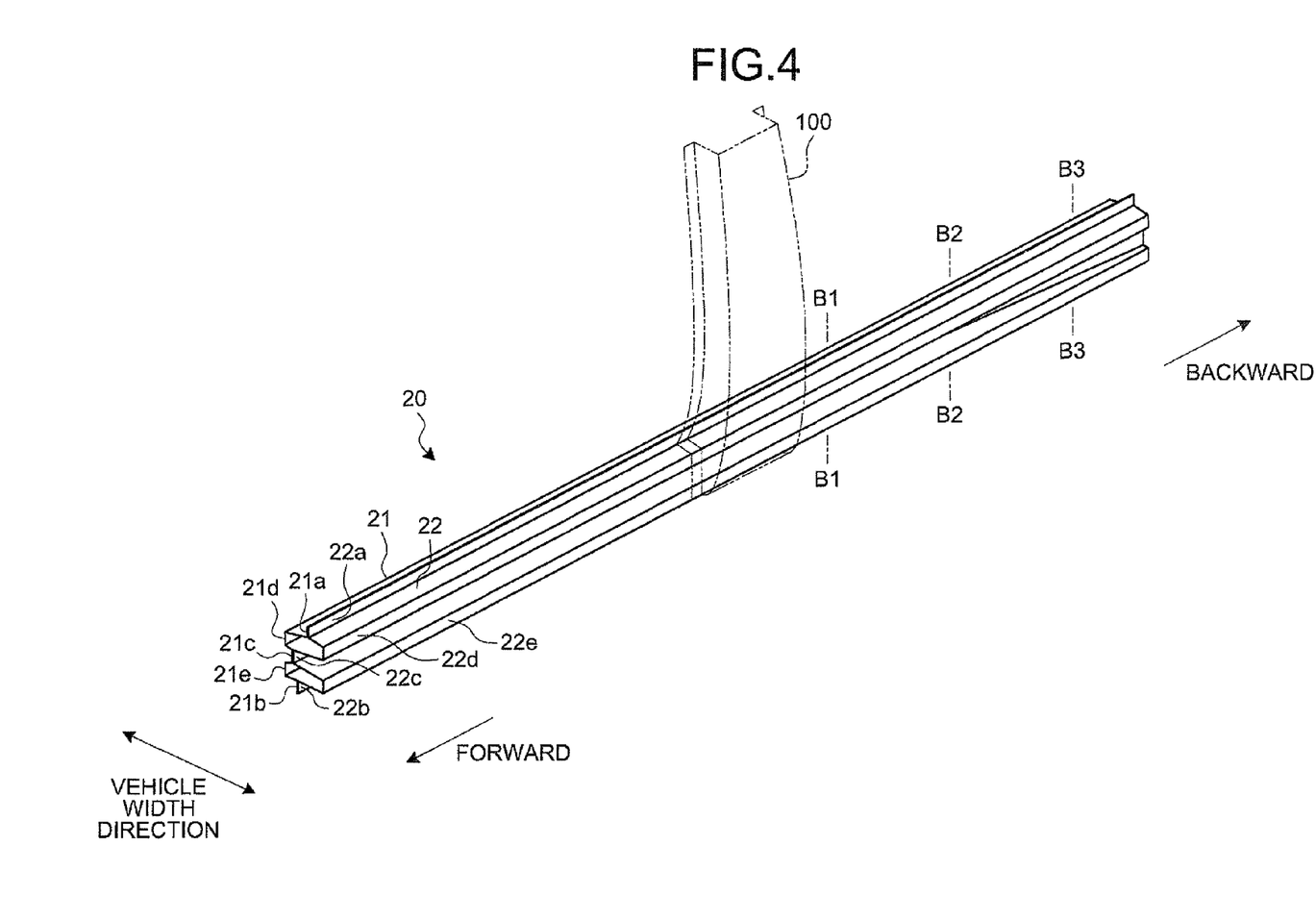
FIG. 4 is a perspective view showing a vehicle body rocker structure of a second embodiment.

A reference numeral 20 of FIG. 4 shows a rocker of the present embodiment. The rocker 20 of the present embodiment is a rocker that joins a rocker inner 21 and a rocker outer 22 in confrontation in a vehicle width direction and changes a rigidity distribution to a load in the vehicle width direction in contrast with the rocker 10 of the aforementioned first embodiment. Also in the rocker 20, the rocker inner 21 is formed with an upper joint portion 21a, a lower joint portion 21b, a convex portion 21c, and concave portions 21d, 21e, and the rocker outer 22 is formed with an upper joint portion 22a, a lower joint portion 22b, a convex portion 22c, and concave portions 22d, 22e.

The upper joint portions 21a, 22a and the lower joint portions 21b, 22b have the same shapes as the upper joint portions 11a, 12a and the lower joint portions 11b, 12b of the rocker 10. Also in the rocker 20, the rocker inner 21 is joined with the rocker outer 22 by the upper joint portions 21a, 22a and the lower joint portions 21b, 22b thereof.

In contrast, as to the convex portions 21c, 22c and the concave portions 21d, 21e, 22d, 22e, a shape is changed between a portion where the rigidity distribution to the rocker 10 is changed and a portion to which the change of the rigidity distribution is not desired. In the portion to which the change of the rigidity distribution is not desired, the convex portions 21c, 22c and the concave portions 21d, 21e, 22d, 22e are formed, and the convex portions 21c, 22c are joined with each other likewise the above rocker 10. With the configuration, in the portion to which the change is not desired, since plural closed cross-sections S1, S2 that are reduced in size likewise the above rocker 10 are formed and a suppression effect of deformation of a cross-sectional shape of the closed cross-sections S1, S2 is enhanced, the rigidity to the load in the vehicle width direction is increased.

Here, in the above rocker 10, when an emphasis is placed on an increase of the rigidity to a load in the vehicle width direction rather than an increase of the strength to a load in the vehicle backward-forward direction, there is still a room for increasing the bending rigidity to the load in the vehicle width direction. For example, in the rocker 10, although the bending rigidity of the closed cross-sections S1, S2 themselves is increased by reducing the closed cross-sections S1, S2 in size, since the bending rigidity to the load in the vehicle width direction in a joint portion where the convex portions 11c, 12c are joined with each other is not so high as that of the closed cross-sections S1, S2, a room for increasing the bending rigidity to the load in the vehicle width direction as the overall rocker 10 remains.

Thus, in the rocker 20, the projecting amount of at least one of the convex portions 21c, 22c is reduced in a portion to which it is desired to more increase the bending rigidity to the load in the vehicle width direction than the above rocker 10. The reduction of the projecting amount changes also the shapes of the concave portions 21d, 21e, 22d, 22e positioned nearby and shallows the concave portions 21d, 21e, 22d, 22e. With the configuration, in the portion, the closed cross-sections are increased, and the bending rigidity to the load in the vehicle width direction as the overall rocker 20 is increased.

Specifically, in the rocker 20, on a vehicle body front side where an emphasis is placed on an increase of the strength to a load in the vehicle body backward-forward direction, the convex portions 21c, 22c are joined with each other so that the plural closed cross-sections S1, S2 are formed likewise the above rocker 10. With the configuration, even if the load in the vehicle body backward-forward direction is applied from wheels to an apical end of the rocker 20 by, for example, the forward projection, the rocker 20 can suppress buckling on the vehicle body front side. In the rocker 20, the vehicle body front side is separated from a vehicle body back side across a center pillar 100 acting as a boundary. Here, the vehicle body back side is backward of the center pillar 100 in a vehicle body.

Figure 5:
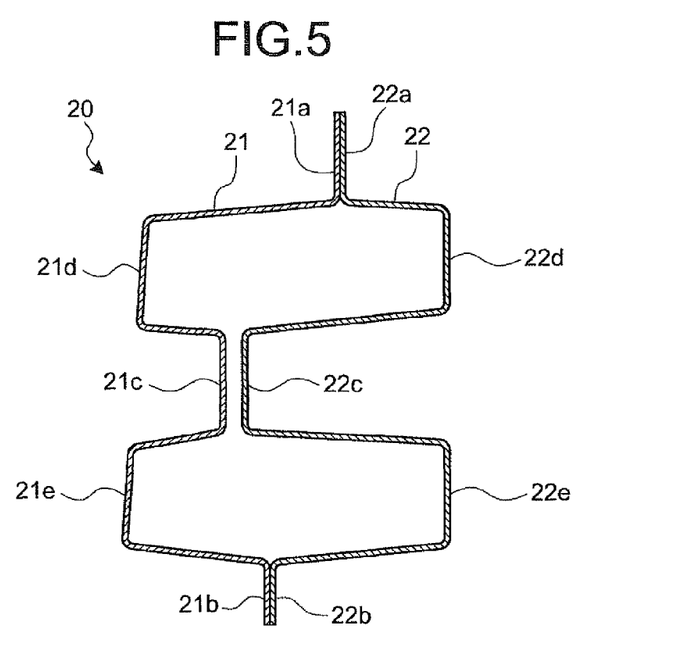
FIG. 5 is a sectional view of FIG. 4 observed from a vehicle body front side by cutting FIG. 4 in a vehicle width direction along a B1-B1 line as well as in a vehicle body up-down direction.
Figure 6:
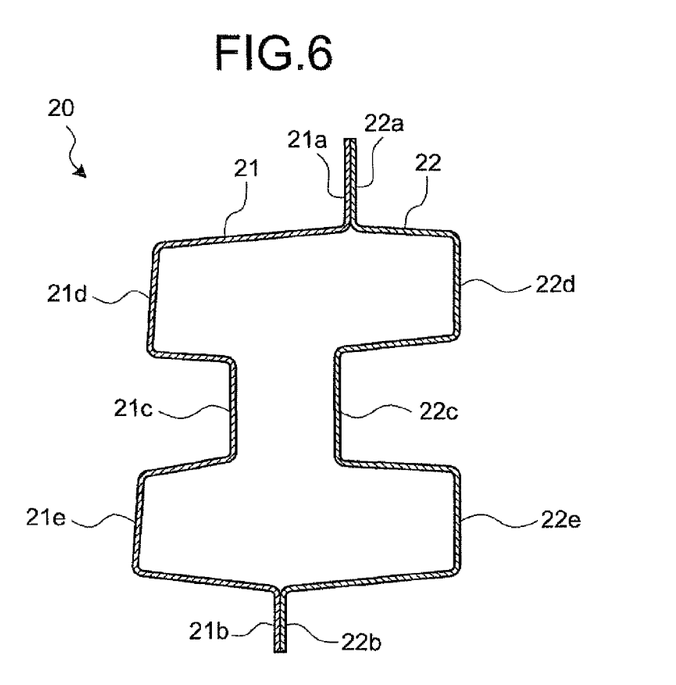
FIG. 6 is a sectional view of FIG. 4 observed from the vehicle body front side by cutting FIG. 4 in the vehicle width direction along a B2-B2 line as well as in the vehicle body up-down direction.
Figure 7:
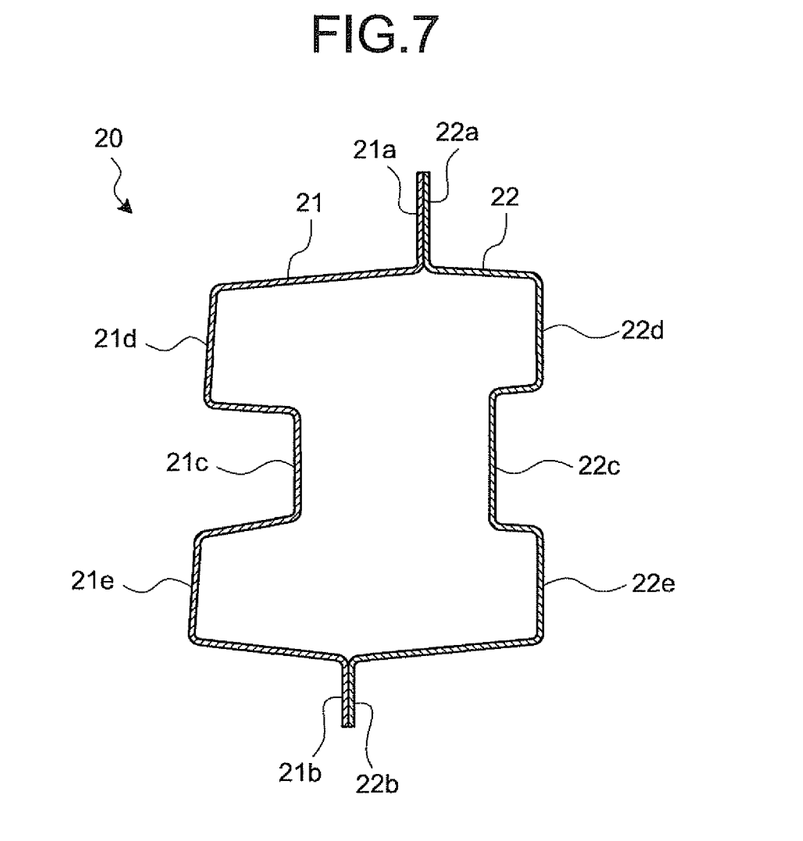
FIG. 7 is a sectional view of FIG. 4 observed from the vehicle body front side by cutting FIG. 4 in the vehicle width direction along a B3-B3 line as well as in the vehicle body up-down direction.

In contrast, on a vehicle body back side, since an emphasis is placed on an increase of the rigidity to the load in the vehicle width direction than that in the vehicle body front side, the projecting amount of the convex portion 21c or/and the convex portion 22c is gradually reduced toward backward of the vehicle body from the center pillar 100. Here, as shown in FIG. 5 to FIG. 7, the projecting amount of the convex portion 22c of the rocker outer 22 is reduced. On the vehicle body back side, since the convex portion 21c is not abutted to the convex portion 22c, no junction is executed therebetween. With the configuration, in the rocker 20, on the vehicle body back side, since the closed cross-sections are increased toward backward of the vehicle body, the bending rigidity to the load in the vehicle width direction can be increased. Note that, on the vehicle body back side, the strength to the load in the vehicle body backward-forward direction is increased toward forward of the vehicle body.

As described above, the rocker 20 can increase the strength to the load in the vehicle body backward-forward direction on the vehicle body front side and increase the bending rigidity to the load in the vehicle width direction on the vehicle body back side by reducing the projecting amount of the convex portion 21c or/and the convex portion 22c on the vehicle body back side. Accordingly, in the example, the rocker 20, which is strong to the load in the vehicle body backward-forward direction on the vehicle body front side, is strong to the load in the vehicle width direction on the vehicle body back side, and is light in weight, can be obtained by a simple configuration without an additional reinforce member. Further, the rocker 20 can easily change a bending rigidity distribution to the load in the vehicle width direction while changing the strength to the load in the vehicle body backward-forward direction by changing the projecting amount of the convex portion 21c or/and the convex portion 22c.

Incidentally, the distribution of the strength to the load in the vehicle body backward-forward direction and the bending rigidity to the load in the vehicle width direction can be also changed by the following methods. Although it is a matter of course that the following three examples can be applied independently, two or more of them may be applied in combination.

For example, a hardness enhancement process is applied to a portion to which it is desired to increase the strength to the load in the vehicle body backward-forward direction. The hardness enhancement process is, for example, a processing hardening process, a high frequency hardening process, a heat treatment process at the time of hot forming, and the like. For example, when the strength of a material is increased by applying the hardness enhancement process to the portions of the rocker inner 21 and the rocker outer 22 on the vehicle body front side, the strength of the rocker 20 to the load in the vehicle body backward-forward direction is increased on the vehicle body front side. Further, a similar hardness enhancement process may be applied to the portions of the rocker inner 11 and the rocker outer 12 of the first embodiment on the vehicle body front side and thereby the strength of the rocker 10 to the load in the vehicle body backward-forward direction on the vehicle body front side can be increased than the rocker 10 of the first embodiment. As described above, since the hardness enhancement process can increase the strength to the load in the vehicle body backward-forward direction, the wall thickness of the rocker inners 11, 21 and the rocker outers 12, 22 can be reduced and thus the weight of the rocker can be reduced while keeping the strength thereof to a desired magnitude.

Further, the distribution of the strength to the load in the vehicle body backward-forward direction and the distribution of the bending rigidity to the load in the vehicle width direction can be also changed by changing the welding point intervals of spot welding for spot welding the convex portions 21c, 22c with each other in the rocker 20 of the embodiment and spot welding the convex portions 11c, 12c with each other in the rocker 10 of the first embodiment. When, for example, the spot welding intervals are increased, the more the intervals increase, the more the deformation suppression effect to the cross-sectional shape of the closed cross-sections between welding points is reduced than that to spot welded portions and thus the bending rigidity to the load in the vehicle width direction is reduced. Further, at the time, as the deformation suppression effect to the closed cross-sections is reduced, since buckling is liable to occur to the load in the vehicle body backward-forward direction, the strength to the load is reduced. Accordingly, when it is desired to increase the strength to the load in the vehicle body backward-forward direction and the bending rigidity to the load in the vehicle width direction, it is sufficient to reduce the spot welding intervals of the portions, whereas when it is desired to reduce the strength and the bending rigidity, it is sufficient to increase the spot welding intervals of the portions.

Figure 8:
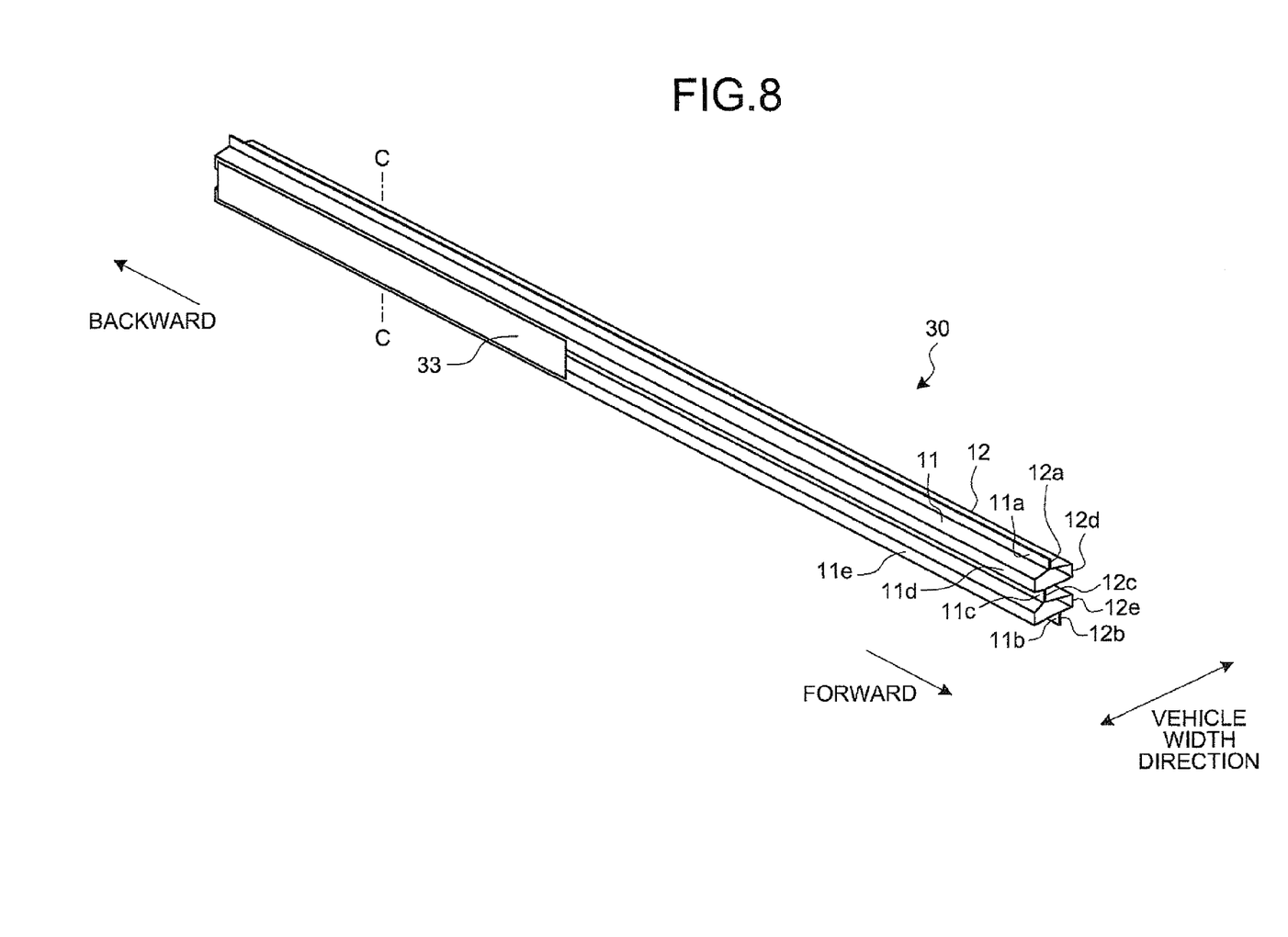
FIG. 8 is a perspective view showing the vehicle body rocker structure of the second embodiment.
Figure 9:
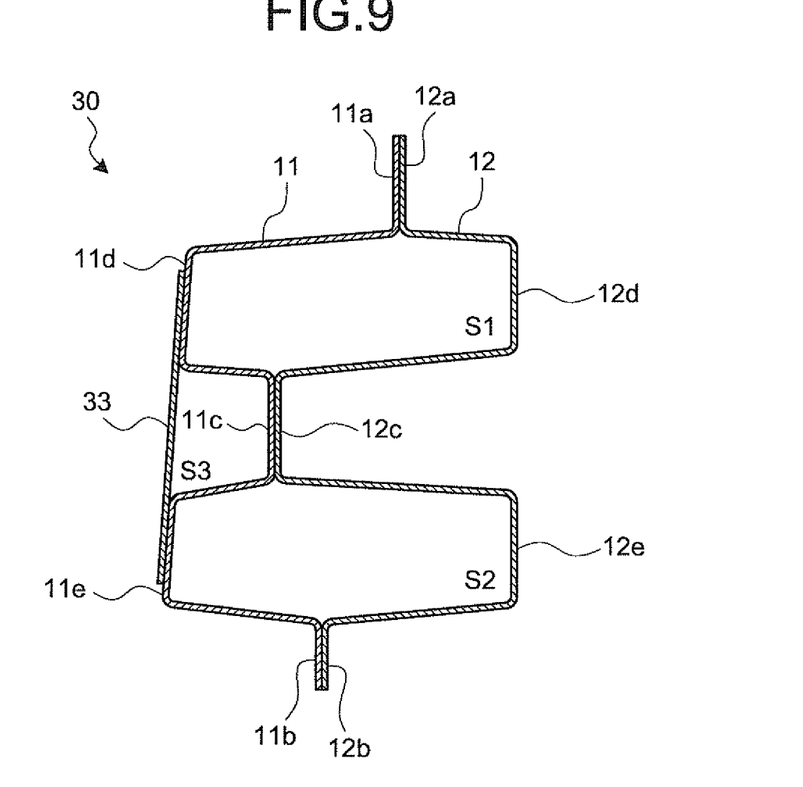
FIG. 9 is a sectional view of FIG. 8 observed from the vehicle body front side by cutting FIG. 8 in the vehicle width direction along a C-C line as well as in the vehicle body up-down direction.

Further, in the rocker 20 of the embodiment and the rocker 10 of the first embodiment, a reinforcing plate may be disposed to a portion where it is desired to increase the bending rigidity to the load in the vehicle width direction. The reinforcing plate is disposed so as to close an opening portion in the vehicle width direction formed by the convex portions 11c, 21c of the rocker inners 11, 21 or/and the convex portions 12c, 22c of the rocker outers 12, 22. With the configuration, since the reinforcing plate forms a new closed cross-section, the number of the closed cross-sections increases and thereby the bending rigidity to the load in the vehicle width direction can be increased. FIG. 8 exemplifies an example of the reinforcing plate and shows a rocker 30 in which a reinforcing plate 33 is disposed to the rocker 10 of the first embodiment. The reinforcing plate 33 closes an opening portion on a vehicle back side in the vehicle width direction formed by the convex portion 11c of the rocker inner 11 and, as shown in FIG. 9, a new closed cross-section S3 is formed. Accordingly, the rocker 30 can increase the bending rigidity to the load in the vehicle width direction on the vehicle back side than the rocker 10.

Third Embodiment

A third embodiment of the vehicle body rocker structure according to the present invention will be explained based on FIG. 10.

In the rocker 10 of the first embodiment or the rockers 20, 30 of the second embodiment described above, the rocker structure of the present embodiment reduces the rigidity to a load of a joint portion with a center pillar 100 in a vehicle width direction more than a periphery. When the load in the vehicle width direction is input, a rocker can be flexed in a load direction in the joint portion with the center pillar 100 by making the rigidity stronger or weaker. Then, the rocker can generate a reaction force to the load in the vehicle width direction by the flexure.

Here, the rigidity in the joint portion with the center pillar 100 may be reduced by increasing the rigidity of the portion other than the joint portion with the center pillar 100 or may be reduced by reducing the rigidity of the joint portion with the center pillar 100.

When, for example, the rocker 10 of the first embodiment is used as a base, the former case can be realized by reducing a projecting amount backward of a vehicle body than the center pillar 100 in a convex portion 11c or/and a convex portion 12c as well as disposing the reinforcing plate 33 shown in the second embodiment more forward of the vehicle body than the center pillar 100. Further, the former case can be also realized by disposing the reinforcing plate 33 shown in the second embodiment to a portion other than the joint portion with the center pillar 100.

Figure 10:
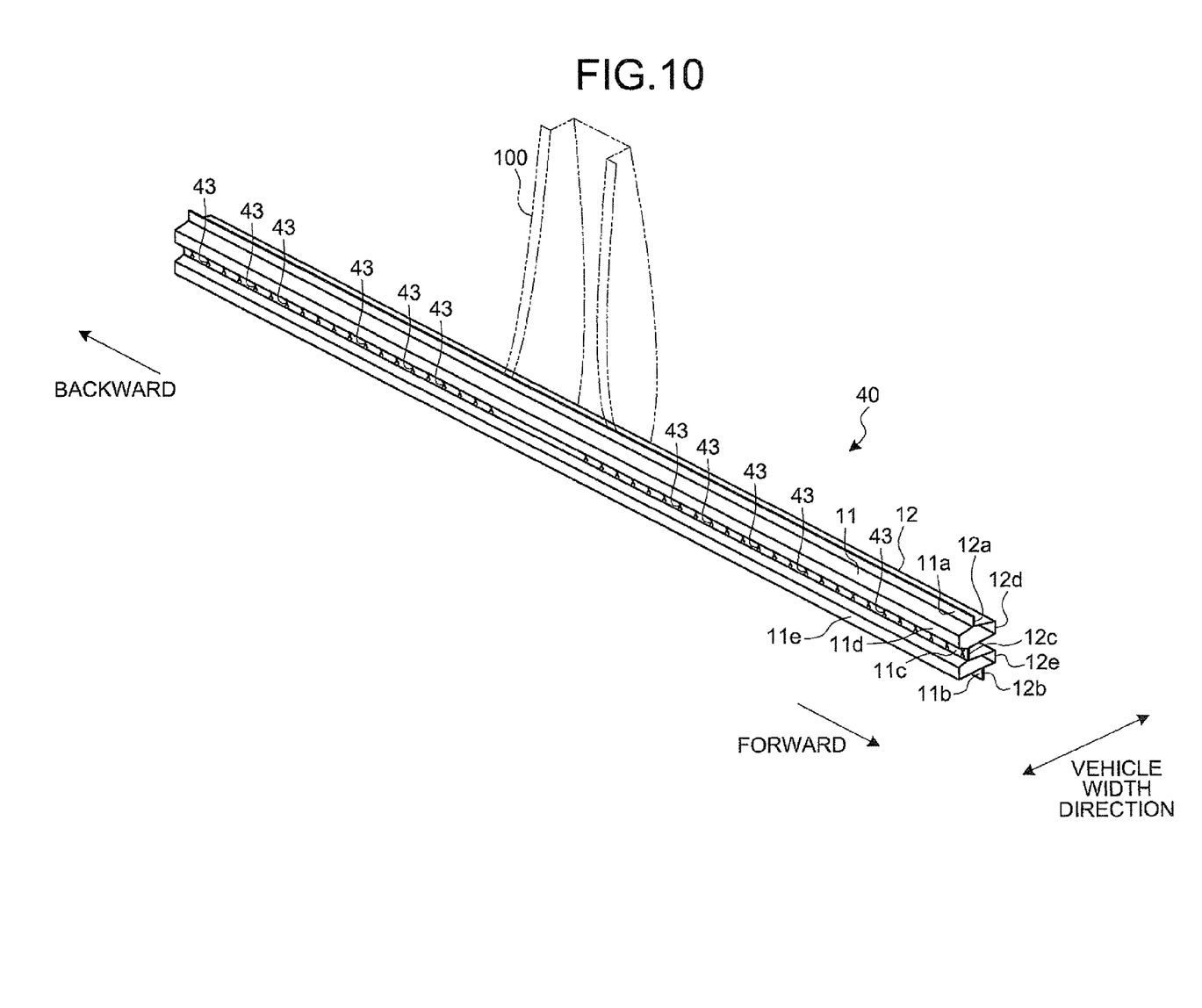
FIG. 10 is a perspective view showing a vehicle body rocker structure of a third embodiment.

In contrast, in the latter case, likewise a rocker 40 exemplified in FIG. 10, it is sufficient in the rocker 10 of the first embodiment to join the convex portions 11c, 12c other than the joint portion with the center pillar 100 with each other and not to join the convex portions 11c, 12c in the joint portion. That is, in the rocker 40, although plural welding points 43 are disposed to the portion other than the joint portion with the center pillar 100, no welding point 43 is disposed to the joint portion. With the configuration, in the joint portion with the center pillar 100, since a deformation suppression effect to the cross-sectional shape of closed cross-sections S1, S2 is more weakened than a periphery, the rigidity to a load in a vehicle width direction is reduced. Accordingly, when the load in the vehicle width direction is input, the rocker 40 is flexed in a load direction in the joint portion with the center pillar 100 and can generate a large reaction force to the load while keeping a state that the cross-sectional shape of the closed cross-sections S1, S2 is less deformed by the flexure.

Fourth Embodiment

Figure 11:
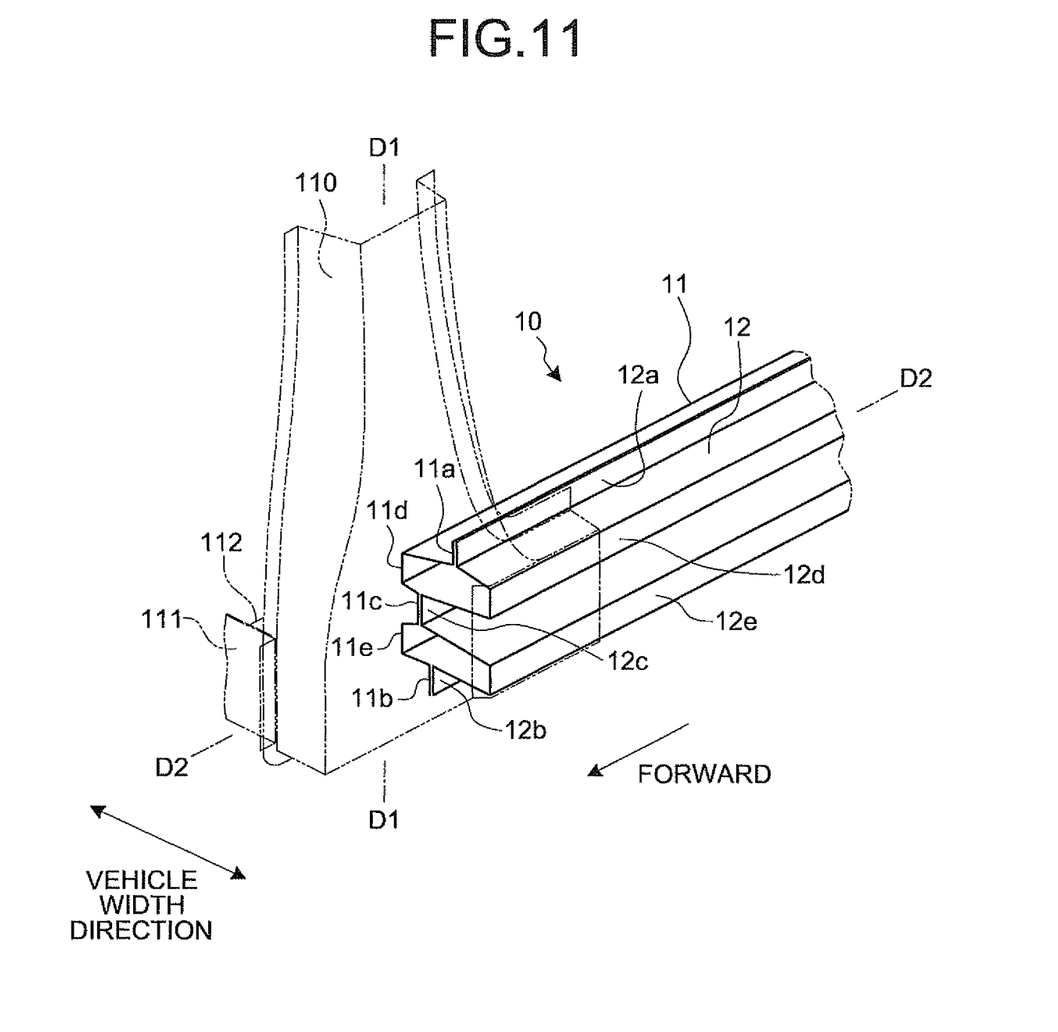
FIG. 11 is a perspective view showing a vehicle body rocker structure of a fourth embodiment.
Figure 12:
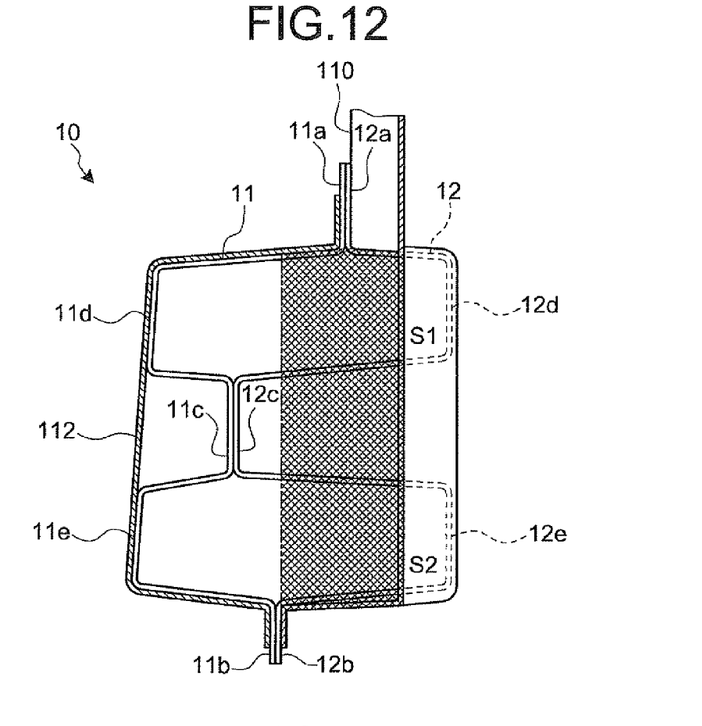
FIG. 12 is a sectional view of FIG. 11 observed from the vehicle body front side by cutting FIG. 11 in a vehicle width direction along a D1-D1 line as well as in a vehicle body up-down direction.
Figure 13:
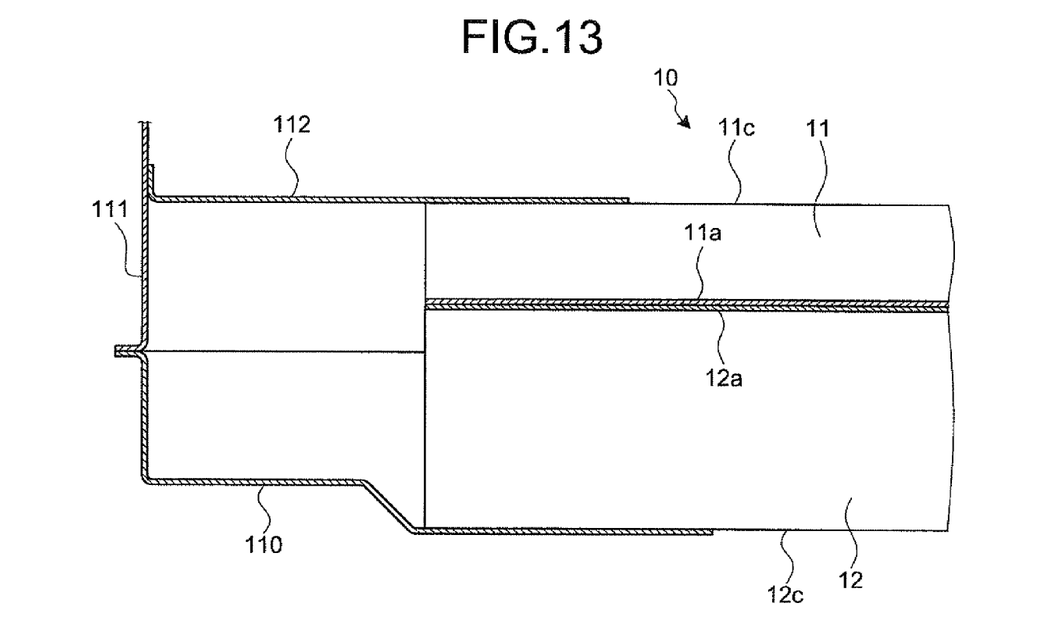
FIG. 13 is a sectional view of FIG. 11 observed from the vehicle body front side by cutting FIG. 11 in the vehicle width direction along a D2-D2 line as well as in the vehicle body up-down direction.

An fourth embodiment of the vehicle body rocker structure according to the present invention will be explained based on FIG. 11 to FIG. 13.

The rocker structure of the present embodiment is configured in the rockers 10, 20, 30, 40 described above such that, as shown in FIG. 11, an apical end of the rocker structure is inserted into a lower portion of a front pillar (specifically, a front pillar lower) 110 from a vehicle body back side and joined with the front pillar 110 as well as the strength to a load in a vehicle body backward-forward direction is made higher in an apical end of the front pillar 110 than in a not inserted portion of the apical end in a lower portion of the front pillar 110. In FIG. 11, the rocker 10 is exemplified for the purpose of convenience of illustration. Note that the front pillar 110 is joined to a dash panel 111. Further, the dash panel 111 is joined with a front rocker 112 that is joined to apical ends of the rockers 10, 20, 30, 40.

Here, the apical ends of the rockers 10, 20, 30, 40 have a lot of ridge lines on a cross section cut in a vehicle width direction as well as in a vehicle body up-down direction and thereby the strength to the load in the vehicle body backward-forward direction is increased. Accordingly, exemplified here is that the strength of the lower portion of the front pillar 110 to the load in the vehicle body backward-forward direction is made lower than the strength of the apical ends of the rockers 10, 20, 30, 40.

In the embodiment, in the not inserted portion of the apical end in the lower portion of the front pillar 110, the strength of a portion positioned more forward of a vehicle body than the apical end is reduced. Specifically, the size of a cross section of the portion cut in the vehicle width direction as well as in the vehicle body up-down direction is made smaller than the size of a cross-section of the apical end cut likewise (FIGS. 12, 13). At the time, the magnitude of the cross-section of the apical end when observed from the vehicle body backward-forward direction is compared with the magnitude of a cross-section of the front pillar 110 portion overlapping the cross-section (a cross-hatched portion of FIG. 12). With the configuration, in the rocker structure, when the load in the vehicle body backward-forward direction is applied to the front pillar 110 from a vehicle front side, the front pillar 110 that is positioned more forward of the vehicle body than the rockers 10, 20, 30, 40 can be buckled and deformed. Then, since energy resulting from a load by the buckling deformation is absorbed by the front pillar 110, in the rocker structure, the load in the vehicle body backward-forward direction that is input to the apical ends of the rockers 10, 20, 30, 40 can be reduced and thereby deformation of the rockers 10, 20, 30, 40 by the load can be suppressed.

Incidentally, in the example, although strength is adjusted on the front pillar 110 side using the rockers 10, 20, 30, 40 as a base, when the strength of the lower portion of the front pillar 110 cannot be weakened, it is sufficient to more increase the strength of the apical ends of the rockers 10, 20, 30, 40 (for example, an increase of the number of convex portions).

INDUSTRIAL APPLICABILITY

As described above, the vehicle body rocker structure according to the present invention is useful to a technology for improving the strength to a load in a vehicle body backward-forward direction and the rigidity to a load in a vehicle width direction while executing simplification and reducing a weight.

REFERENCE SIGNS LIST 10, 20, 30, 40 ROCKER
11, 21 ROCKER INNER
12, 22 ROCKER OUTER
11a, 12a, 21a, 22a UPPER JOINT PORTION
11b, 12b, 21b, 22b LOWER JOINT PORTION
11c, 12c, 21c, 22c CONVEX PORTION
11d, 11e, 12d, 12e, 21d, 21e, 22d, 22e CONCAVE PORTION
33 REINFORCING PLACE
43 WELDING POINT
100 CENTER PILLAR
110 FRONT PILLAR
S1, S2, S3 CLOSED CROSS-SECTION

The invention claimed is:

1. A vehicle body rocker structure comprising:
a plate-like inner member and a plate-like outer member that extend in a vehicle backward-forward direction and confront with each other in a vehicle width direction as a structure member constituting a rocker, wherein respective cross-sections of the inner member and the outer member cut in a vehicle width direction as well as in a vehicle body up-down direction comprise an upper joint portion on a vehicle body upper side, a lower joint portion on a vehicle body lower side, at least one convex portions caused to project to opposite sides confronting between the upper joint portion and the lower joint portion, and concave portions disposed between the upper joint portion and the lower joint portion as well as on a vehicle body upper side and a vehicle body lower side of the convex portions, respectively, wherein the upper joint portions, the lower joint portions, and the convex portions of the inner member and the outer member are joined with each other, respectively and a plurality of closed cross-sections are formed in the vehicle body up-down direction, wherein in the inner member, a projecting surface of the convex portion is disposed nearer to the inside of the vehicle body than the upper joint portion and the lower joint portion, wherein in the inner member, the lower joint portion is disposed nearer to the inside of the vehicle body than the upper joint portion, wherein the respective cross-sections of the inner member and the outer member have a uniform shape along the vechicle backward-forward direction, and wherein the convex portion of the inner member and the outer member are joined with each other by spot welding at welding points set at substantially equal intervals along the vechicle backward-forward direction.

2. The vehicle body rocker structure according to claim 1, wherein a hardness enhancement process is applied to the vehicle body front sides of the inner member and the outer member.

3. The vehicle body rocker structure according to claim 1, wherein reinforcing plates are disposed to the vehicle body rear sides of the inner member or/and the outer member.

4. The vehicle body rocker structure according to claim 1, wherein a rigidity of the rocker to a load in a joint portion with a center pillar in a vehicle width direction is more reduced than a periphery.

5. The vehicle body rocker structure according to claim 1, wherein the rocker joins the convex portions of the inner member and the outer member other than a joint portion with a center pillar.

6. The vehicle body rocker structure according to claim 1, wherein an apical end of the rocker is inserted into and joined with a front pillar as well as the strength to a load in a vehicle body backward-forward direction is made higher in the apical end than a not inserted portion of the apical end in the front pillar.

7. The vehicle body rocker structure according to claim 2, wherein reinforcing plates are disposed to the vehicle body rear sides of the inner member or/and the outer member.

8. The vehicle body rocker structure according to claim 2, wherein a rigidity of the rocker to a load in a joint portion with a center pillar in a vehicle width direction is more reduced than a periphery.

9. The vehicle body rocker structure according to claim 1, wherein the rocker joins the convex portions of the inner member and the outer member other than a joint portion with a center pillar.

10. The vehicle body rocker structure according to claim 2, wherein the rocker joins the convex portions of the inner member and the outer member other than a joint portion with a center pillar.

11. The vehicle body rocker structure according to claim 3, wherein the rocker joins the convex portions of the inner member and the outer member other than a joint portion with a center pillar.

12. The vehicle body rocker structure according to claim 2, wherein an apical end of the rocker is inserted into and joined with a front pillar as well as the strength to a load in a vehicle body backward-forward direction is made higher in the apical end than a not inserted portion of the apical end in the front pillar.

13. The vehicle body rocker structure according to claim 3, wherein an apical end of the rocker is inserted into and joined with a front pillar as well as a strength to a load in a vehicle body backward-forward direction is made higher in the apical end than a not inserted portion of the apical end in the front pillar.

14. The vehicle body rocker structure according to claim 1, wherein the lower joint portion is disposed nearer to the projecting surface of the convex portion than the upper joint portion.

* * * * *